(12) United States Patent
Saeck et al.

(10) Patent No.: US 9,157,656 B2
(45) Date of Patent: Oct. 13, 2015

(54) DEVICE FOR GUIDING SOLAR RADIATION

(75) Inventors: Jan Peter Saeck, Cologne (DE); Boris Belhomme, Munich (DE); Peter Schwarzboezl, Bonn (DE)

(73) Assignee: Deutsches Zentrum Fuer Luft-Und Raumfahrt E.V., Cologne (DE)

( * ) Notice: Subject to any disclaimer, the term of this patent is extended or adjusted under 35 U.S.C. 154(b) by 913 days.

(21) Appl. No.: 13/389,077

(22) PCT Filed: Jul. 30, 2010

(86) PCT No.: PCT/EP2010/061131
§ 371 (c)(1),
(2), (4) Date: Feb. 6, 2012

(87) PCT Pub. No.: WO2011/018367
PCT Pub. Date: Feb. 17, 2011

(65) Prior Publication Data
US 2012/0132194 A1    May 31, 2012

(30) Foreign Application Priority Data

Aug. 12, 2009 (DE) .......................... 10 2009 037 280

(51) Int. Cl.
*F24J 2/54* (2006.01)
*F24J 2/07* (2006.01)
*F24J 2/38* (2014.01)

(52) U.S. Cl.
CPC .... *F24J 2/07* (2013.01); *F24J 2/38* (2013.01); *Y02E 10/41* (2013.01); *Y02E 10/47* (2013.01)

(58) Field of Classification Search
CPC .................. F24J 2/38; F24J 2/54; F24J 3/02
USPC ................ 126/574, 425, 573; 136/248; 353/3
See application file for complete search history.

(56) References Cited

U.S. PATENT DOCUMENTS

| | | | | |
|---|---|---|---|---|
| 4,519,382 A | * | 5/1985 | Gerwin | 126/578 |
| 4,564,275 A | * | 1/1986 | Stone | 353/3 |
| 5,978,021 A | * | 11/1999 | Kim | 348/218.1 |
| 8,651,100 B2 | * | 2/2014 | Pfahl et al. | 126/573 |
| 2010/0236626 A1 | * | 9/2010 | Finot et al. | 136/259 |

FOREIGN PATENT DOCUMENTS

| | | | |
|---|---|---|---|
| AT | 504338 A4 | 5/2008 | |
| DE | 102006053758 A1 | 5/2008 | |
| DE | 102007051 383 A1 * | 4/2009 | ............... F24J 2/38 |
| DE | 102007051383 A1 | 4/2009 | |

OTHER PUBLICATIONS

International Search Report dated Apr. 28, 2011 from corresponding International Patent Application No. PCT/EP2010/061131—3 pages.

* cited by examiner

*Primary Examiner* — Gregory Huson
*Assistant Examiner* — Nikhil Mashruwala
(74) *Attorney, Agent, or Firm* — Maier & Maier, PLLC

(57) ABSTRACT

The invention relates to a reflection device that can track the location of sun, focusing solar radiation on a radiation receiver. The tracking is controlled by means of an auxiliary mirror guiding an auxiliary beam to a target. The position of the point of incidence of the auxiliary beam on the target is detected by a video camera and an image capture system, and said actual position is adjusted to a prescribed target position. It is thus achieved that the main beam is always precisely aimed at the radiation receiver.

10 Claims, 2 Drawing Sheets

DEVICE FOR GUIDING SOLAR RADIATION

RELATED APPLICATIONS

Figure 1:
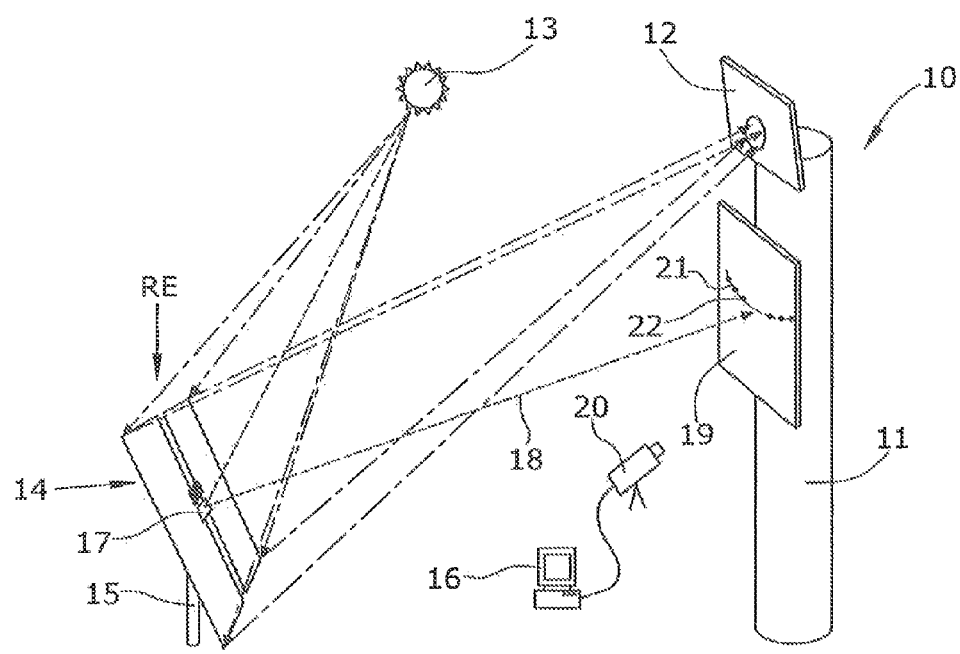

This is the U.S. national stage application which claims priority under 35 U.S.C. §371 to International Patent Application No.: PCT/EP2010/061131 filed on Jul. 30, 2010, which claims priority to German Patent Application No. 102009037280.6 filed on Aug. 12, 2010, the disclosures of which are incorporated by reference herein their entireties.

The invention refers to a device for guiding solar radiation along a beam path onto a radiation receiver, comprising a reflection device having a reflection stage adapted to track the position of the sun.

Devices that capture solar radiation and transmit the same to a receiver require a tracking that guarantees that the device is always aligned with the position of the sun which changes as the day passes by. Solar energy generation devices comprise different types of solar installations. These include, among others, tower power plants comprising, all distributed on one plane, numerous heliostats, dishes, i.e. concave mirrors that concentrate sunlight on one focus, as well as solar furnaces provided with a two-stage reflection device, wherein the first stage is a reflection stage adapted to track the position of the sun, whereas the second stage has a focusing function. In all cases the purpose is to always focus the solar energy onto the radiation receiver despite the changing direction of incidence. In solar tower power plants the reflection device is composed of a plurality of heliostats tracking the position of the sun on two axes and reflecting and focusing the sunlight onto a receiver plane. In order to obtain a high efficiency and for reasons of safety, it is necessary to control or influence the position of the reflection of the sun generated by each single heliostat, i.e. the target point of the heliostat. In the course of the day the predefined target points can be met only in an insufficient manner due to tracking errors. Tracking errors occur, for example, as a result of deviations in the calculation of the position of the sun or because of a non-perpendicular orientation of the heliostat-azimuth axes. With considerable effort and little success it is attempted to minimize the tracking errors using complex calibration measures.

U.S. Pat. No. 3,564,275 describes an automatic heliostat tracking method for a tower power plant. In operation, the heliostat is aligned such that the incident solar radiation impinges on a receiver arranged on a tower. Further, a target is provided at the tower. During a calibration step the radiation exploitation operation is interrupted and the heliostat is aligned such that the solar radiation now impinges on the target and no longer impinges on the receiver. A camera takes pictures of the target and detects the position of the point of incidence on the target. In dependence thereon, the alignment of the heliostat is controlled such that the point of incidence is situated at a defined predetermined position on the target. A computer calculates the angular adjustment of the heliostat that is necessary to adjust the light beam, which has been aligned with the target, such that this light beam now impinges on the receiver at the same position of the sun. Such a calibration method requires an interruption of the operation and thus of energy generation. Moreover, the heliostat must be pivoted twice.

It is an object of the invention to precisely detect the actual position of the reflection of the sun or of the target point of the reflection device in a device for guiding solar radiation, in order to minimize the deviation between the set target point and the actual target point by means of control. Thereby, it is intended to save costs when setting up the reflection device and to increase the economic efficiency of solar energy generation by achievable increases in performance.

The present device for guiding solar radiation is defined by claim 1. It is characterized in that the last reflection stage of the reflection device in the beam path comprises auxiliary mirror whose mirror surface forms an angle with the reflection stage such that, when solar radiation is guided onto the radiation receiver, an auxiliary beam deflected from the solar radiation impinges on the target.

With the device of the present invention, a small part of the solar radiation impinging on the reflection device is deflected by means of an auxiliary mirror, as it were. This auxiliary beam is guided to the target. Depending on the type of the respective reflection device, the relation between the point of incidence of the main beam on the radiation receiver and the point of incidence of the auxiliary beam on the target is either fixedly predetermined or it is variable as a function of the respective position of the sun in the course of the day, but can be calculated in any case. The computer can predetermine a respective set position of the point of incidence of the auxiliary beam on the target. When the auxiliary beam impinges on this set position, the main beam impinges exactly on the focus on the radiation receiver. The reflection device can be controlled such that the actual position of the point of incidence is made to be equal to the set position.

It is an advantage of the device of the present invention that a tracking or control can be performed during the operation of the radiation receiver. Thus, the reflection device does not have to be pivoted to another radiation receiver. Moreover, the tracking can be performed with very high precision and any number of times.

The device of the present invention can be provided with a single-stage or a multi-stage reflection device. A single-stage reflection device is a heliostat field, for instance, which guides solar radiation onto the receiver of a tower after a single reflection. Another single-stage reflection device is a dish which also concentrates solar radiation on a focus after a single reflection. A two-stage reflection device operates with two reflections occurring one after the other in the beam path. The first reflection stage in the beam path tracks the position of the sun. The second reflection stage is a concentrator concentrating the solar radiation onto a focus. In this case, the auxiliary mirror is provided at the last reflection stage of the beam path and the target is near the focus of this last reflection stage, but offset therefrom. The alignment of the first reflection stage can be controlled on the basis of the point of incidence of the auxiliary beam n the target.

In contrast thereto, the single reflection stage of a single-stage reflection device meets both the function of capturing solar radiation and the function of focusing. In this case, the auxiliary mirror is provided rigidly at the reflection stage which is movable under control.

With a tower power plant, numerous heliostats are aimed at the radiation receiver, at least some of the heliostats being tracked independently. A plurality of heliostats may share a common auxiliary mirror.

In order to avoid having to provide a respective target for each heliostat, a preferred embodiment of the invention provides light blocking devices that allow only the light of one of a plurality of auxiliary mirrors to impinge on the target at a time. This allows for a time-selective control of each heliostat in a time multiplexed operation, as it were. The respective controls of the individual heliostats do not influence each other. The light blocking devices may be closures (shutters) or simply obstructions that are temporarily moved into the path of the auxiliary beam.

The evaluation of the points of incidence on the target is preferably performed using a camera that generates an image of the target with the point of incidence of the auxiliary beam visible thereon. A computer evaluates the position of the point of incidence as the actual position. A memory includes the associated set position. The computer can then adapt the actual position to the set position in order to achieve a precise alignment.

The following is a detailed description of embodiments of the invention with reference to the drawings.

Figure 2:
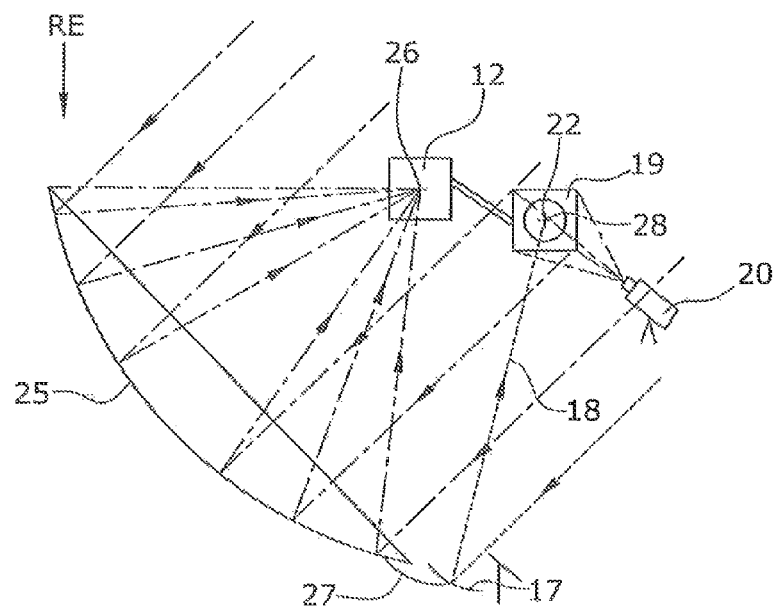
Figure 3:
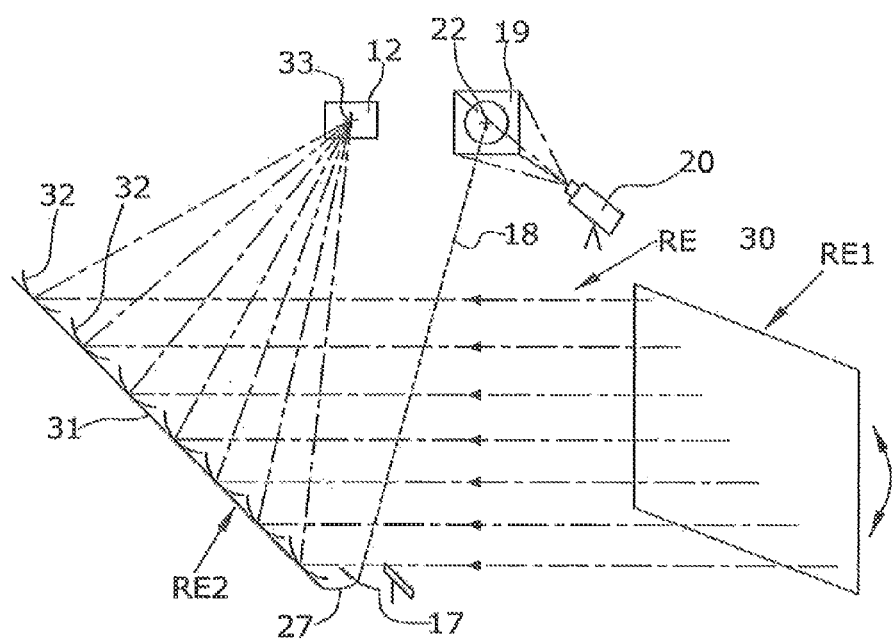

In the Figures:

FIG. 1 is a perspective view of a tower power plant with a heliostat field illustrating the tracking of a heliostat in dependence on the position of the sun, FIG. 2 is a schematic illustration of a dish concentrator with an auxiliary mirror, and FIG. 3 is an illustration of a multi-stage reflection device with heliostat and concentrator.

FIG. 1 illustrates a tower power plant 10 having a stationary radiation receiver 12 provided on a tower 11. The radiation receiver is a receiver that absorbs the radiation impinging thereon in a concentrated manner, converts the same into heat and transferring the same to a heat carrier medium.

The solar radiation originating from the sun 13 impinges on a reflection device RE which in the present case is a heliostat field of which only one heliostat 14 is illustrated in FIG. 1. The heliostats are planar or slightly bent mirrors that direct sunlight onto the radiation receiver 12. Each heliostat 14 is arranged on a support 15 and is pivotable under control about a vertical axis so as to change the azimuth angle, and about a horizontal axis so as to change the elevation angle. The drive is not illustrated in FIG. 1. It is controlled by a central computer 16.

The heliostat 14 comprises an auxiliary mirror 17 fixedly mounted thereon whose mirror plane is slightly tilted with respect to that of the heliostat 14. The auxiliary mirror 17 guides an auxiliary beam 18 obtained from the solar radiation onto a target 19 arranged on the tower 11 near the receiver 12 but offset from the same. The target 19 is a plate which is configured to reflect in a diffuse manner so that the point of incidence of the auxiliary beam 18 is optically clearly visible. The target 19 is similar to a projection wall. It is not absorbing so that it allows the determination of the flux density of the point of incidence of the auxiliary beam. An image o the target 19 is captured by a video camera 20 which is connected to the computer 16 for image evaluation. The camera is used to detect the point of incidence of the auxiliary beam on the target and image processing software is used to localize the same in a coordinate system with respect to the target.

In the arrangement illustrated in FIG. 1, the relation between the point of incidence of the auxiliary beam on the target and the point of incidence of the main beam on the radiation receiver 12 is not constant. Rather, it varies as a function of the direction of incidence of the sunlight which changes in the course of the day. Thus dependence is stored in the computer 16. FIG. 1 illustrates a line 21 on the target that indicates the respective set position 22 of the target point of the auxiliary beam at different times of the day. When the point of incidence reaches the set position at a specific time of day, the main beam is aligned precisely with the radiation receiver 12. Thus, in this embodiment, the set position is not a fixedly predetermined point on the target 19.

In the embodiment of FIG. 1, the reflection device RE has only one reflection stage, namely the heliostat 14.

Several heliostats 14 in the heliostat field cooperate with the same target 19. In order to avoid overlaps and interferences between the auxiliary beams of the individual heliostats (non illustrated) light blocking devices are provided that are adapted to selectively interrupt each single auxiliary beam so that only the auxiliary beam of a single heliostat is allowed to pass at a time. In this manner, a time multiplexed operation of the position tracking of the individual heliostats is performed.

FIG. 2 illustrates another embodiment of a reflection device RE configured as a dish concentrator 25 that concentrates the impinging solar radiation onto a focus 26. A tracking device continuously aligns the dish concentrator 25 with the sun in such a manner that it substantially faces the sun frontally. The focus 6 is always directed towards a radiation receiver 12. A target 19 is rigidly connected with this radiation receiver 12, the position of the target being offset from that of the radiation receiver 12.

An auxiliary mirror 17 is connected with the dish concentrator 25 by means of a rigid connector 27 so that the auxiliary mirror 17 is moved along when the dish concentrator is pivoted. In this embodiment the auxiliary mirror 17 is slightly concave so that it focuses the auxiliary beam onto the plane of the target.

In this embodiment the relation between the point of incidence of the focus 26 on the radiation receiver 12 and the point of incidence 28 of the auxiliary beam 18 on the target 19 is fixed. Therefore, the set position 22 on the target 19 is fixed. The point of incidence 28 is controlled to the set position 22. Then, the point of incidence of the main radiation is at the correct position on the radiation receiver 12.

FIG. 3 illustrates an embodiment of a two-stage reflection device RE with a first reflection stage RE1 and a second reflection stage RE2 arranged in succession along the beam path of the sunlight. The first reflection stage RE1 is formed by a heliostat 30 tracking the sun and guiding the solar radiation onto a stationary concentrator 31 which comprises a plurality of curved mirror surfaces 32. The radiation impinging in parallel on the concentrator 31 is concentrated on a focus 33 and is converted in a stationary radiation receiver 12.

An auxiliary mirror 17 is fastened to the concentrator 31, which guides an auxiliary beam 18 onto a target 19. When the auxiliary beam reaches a set position 22 on the target 19, the focus 33 is at its appropriate position on the radiation receiver 12.

A video camera 20 with an image processing system detects the point of incidence of the auxiliary beam 18 on the target 19. A connected computer controls the heliostat 30 in such a manner that the actual position of the point of incidence is controlled on the target 19 to be the set position 22.

The arrangement in FIG. 3 is particularly suitable for operating a solar furnace, e.g. for melting materials.

Basically, the invention is not only applicable in the generation of energy, but may also be used, for instance, to guide solar radiation, e.g. for the daylight illumination of buildings.

The invention claimed is:

1. A device for guiding solar radiation along a beam path onto a radiation receiver, comprising a single- or multi-stage reflection device having a reflection stage arranged first in the beam path and adapted to track the position of the sun, and comprising a target fixedly connected with the radiation receiver and spatially separated therefrom, wherein the reflection stage of the reflection device, which is arranged last in the beam path, comprises an auxiliary mirror whose mirror surface forms such an angle with the reflection stage that, when the solar radiation is guided onto the radiation receiver, an auxiliary beam deflected from the solar radiation impinges on the target, and wherein a set position of a point of incidence of the auxiliary beam on the target is predetermined and a control of the reflection device is performed by tracking the actual position of the point of incidence of the auxiliary beam.

2. The device of claim 1, wherein the auxiliary mirror is mounted to a last reflection stage of the reflection device.

3. The device of claim 1 wherein the first and the last reflection stages are formed by one and the same reflection stage.

4. The device of claim 1 wherein the reflection device comprises a plurality of heliostats adapted to individually track the position of the sun, at least some of which comprise an auxiliary mirror.

5. The device of claim 1 wherein light blocking devices are provided for the auxiliary mirrors, which allow only the light from one of the plurality of auxiliary mirrors to impinge on the target at a time.

6. The device of claim 1 wherein the reflection device comprises at least one heliostat adapted to track the sun, and that a computer is provided that predetermines different set positions on the target for different times of the day and controls the tracking of the heliostat in accordance with the respective set position.

7. The device of claim 1 wherein a video camera produces an image of the target with the point of incidence of the auxiliary beam visible thereon, and a computer evaluates the position of the point of incidence as the actual position.

8. The device of claim 1 wherein the reflection device comprises a dish concentrator as the reflection stage adapted to be tracked, an auxiliary mirror being fastened to the dish concentrator.

9. The device of claim 1 wherein a computer predetermines a fixed position on the target as a set position and performs tracking of the visible point of incidence of the auxiliary beam on the target in accordance with the set position.

10. The device of claim 1 wherein a first reflection stage comprises at least one heliostat adapted to be tracked and a second reflection stage comprises a stationary concentrator, the auxiliary mirror being mounted to the concentrator.

* * * * *